United States Patent [19]

Speckhart

[11] Patent Number: 5,295,411
[45] Date of Patent: Mar. 22, 1994

[54] TORSIONAL VIBRATION ABSORBER SYSTEM

[76] Inventor: Frank H. Speckhart, 3411 Kingston Pike, Knoxville, Tenn. 37919

[21] Appl. No.: 80,757

[22] Filed: Jun. 22, 1993

[51] Int. Cl.$^5$ .......................... F16F 15/10; F16C 3/04
[52] U.S. Cl. ....................................... 74/574; 74/572; 74/573 R; 74/603; 74/604
[58] Field of Search ..................... 74/572, 573 R, 574, 74/603, 604

[56] References Cited

U.S. PATENT DOCUMENTS

| | | | |
|---|---|---|---|
| 2,127,888 | 8/1938 | Sarazin | 74/574 |
| 2,272,189 | 2/1942 | De Pew | 74/604 |
| 2,280,364 | 4/1942 | Atteslander | 74/604 |
| 2,287,866 | 6/1942 | Criswell | 74/604 |
| 2,306,959 | 12/1942 | Knibbe | 74/574 |
| 2,346,972 | 4/1944 | Kishline | 74/574 |
| 2,361,710 | 10/1944 | Salomon | 74/574 |
| 2,449,087 | 9/1948 | Salomon | 74/574 |
| 3,219,120 | 11/1965 | Hooper | 74/573 R |
| 3,336,818 | 8/1967 | Allen | 74/573 R |
| 3,559,502 | 2/1971 | Lofthouse | 74/574 |
| 3,744,342 | 7/1973 | Kinoshita | 74/604 |
| 3,970,260 | 7/1976 | Bruggisser et al. | 74/573 R X |
| 4,075,909 | 2/1978 | Deakin | 74/573 R |
| 4,569,316 | 2/1986 | Suzuki | 74/604 X |
| 4,594,917 | 6/1986 | Ziegler | 74/573 R X |
| 5,095,786 | 3/1992 | Bellinghausen et al. | 74/574 X |

FOREIGN PATENT DOCUMENTS

| | | | |
|---|---|---|---|
| 60-97444 | 7/1985 | Japan | 74/574 |
| 60-99346 | 7/1985 | Japan | 74/574 |
| 1-115040 | 8/1989 | Japan | 74/574 |
| 401962 | 4/1932 | United Kingdom | 74/574 |
| 586180 | 3/1947 | United Kingdom | 74/573 |
| 2103335 | 7/1982 | United Kingdom | 74/574 |

*Primary Examiner*—Vinh T. Luong
*Attorney, Agent, or Firm*—Michael E. McKee

[57] ABSTRACT

A system for absorbing torsional vibration in a shaft which is drivingly rotated about an axis and wherein the shaft is exposed to torsional disturbances which tend to cyclically increase and decrease the rotational speed of the shaft utilizes a body attachable to the shaft for rotating therewith as the shaft rotates about its axis of rotation and cylindrical rolling elements positioned within cavities disposed in the body. During operation of the system, the torsional disturbances induce pendulum-like motion of the cylindrical elements within the cavities in a manner which absorbs torsional vibration of the shaft. The cylindrical elements, the cavities and the torsional disturbances are related to one another in accordance with an equation which optimizes performance of the system and circumvents time-consuming trial and error techniques during design of the system. The system is particularly well-suited for absorbing torsional vibration in a shaft which is rotated about an axis in response to power pulses generated within an internal combustion engine.

20 Claims, 4 Drawing Sheets

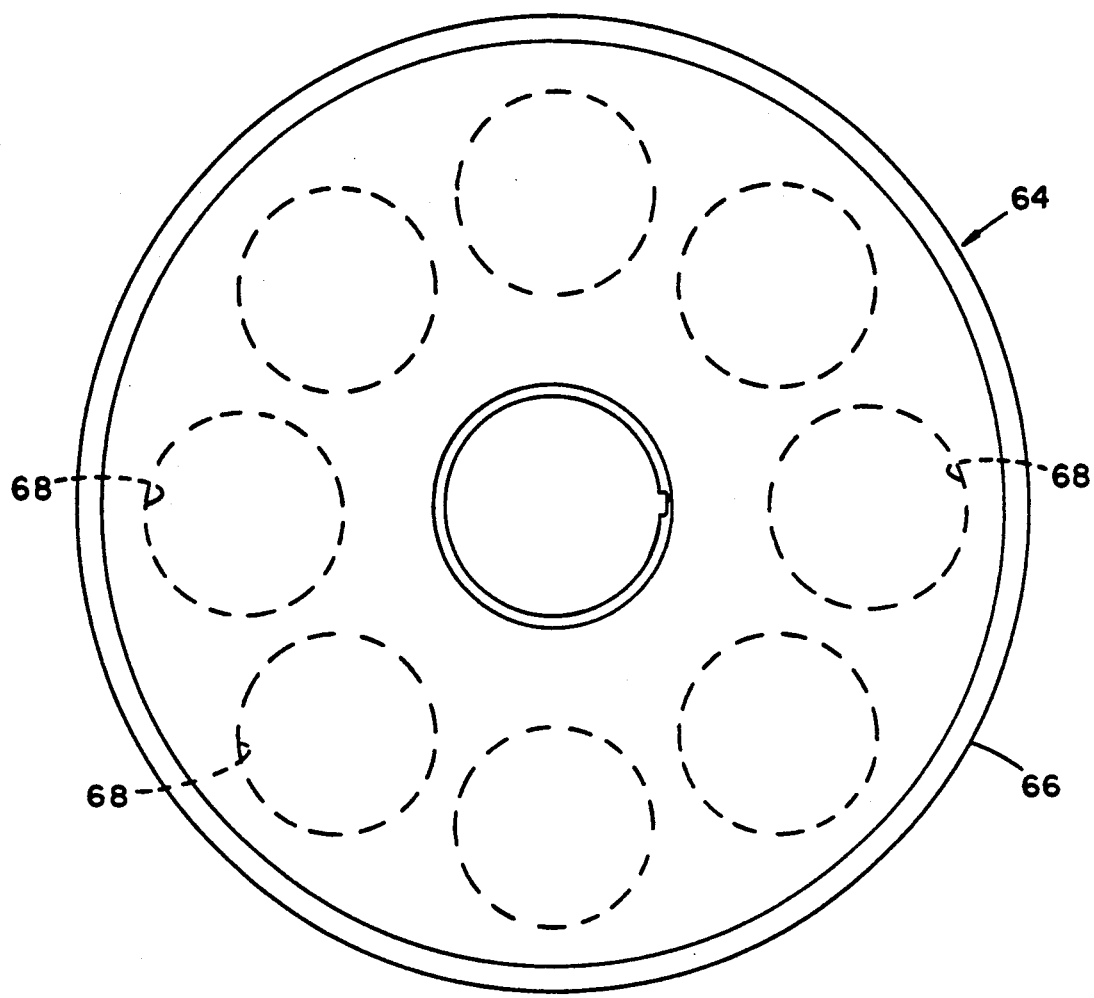
Fig.7
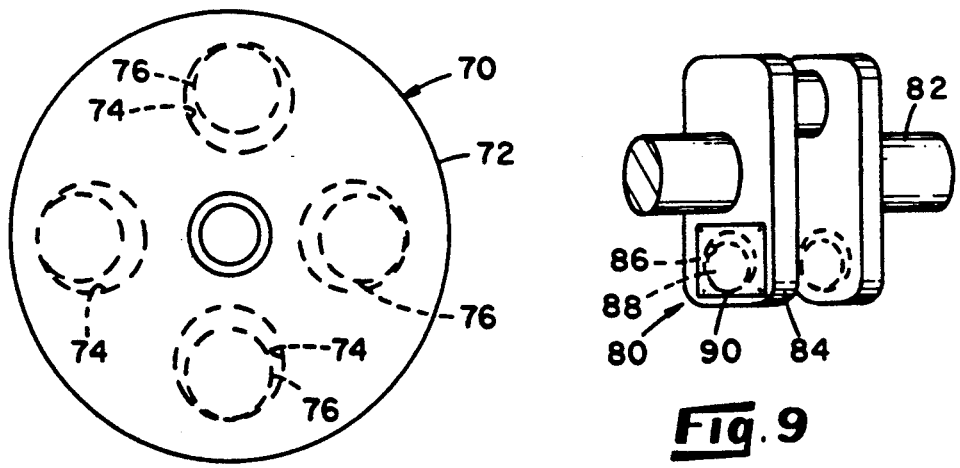
Fig.8
Fig.9

TORSIONAL VIBRATION ABSORBER SYSTEM

BACKGROUND OF THE INVENTION

This invention relates generally to torsional vibration absorbers and relates, more particularly, to means for absorbing torsional vibrations and for reducing speed variations in a rotating shaft.

Shafts which are drivingly rotated commonly experience torsional disturbances during rotation, and these disturbances induce torsional vibrations in the shaft. In an internal combustion engine, for example, the engine crankshaft is exposed to cyclic torsional disturbances which tend to accelerate the shaft (during the power stroke) and which tend to decelerate the shaft (during the compression stroke). As another example, in a multi-blade grinding apparatus having rotating blades which are driven by a drive shaft, the drive shaft is exposed to cyclic torsional disturbances which tend to decelerate the shaft (upon impact of a blade with an object being ground) and tend to accelerate the shaft (upon recovery of the speed of the blade after impact).

The type of torsional disturbances with which this invention is concerned are those which are substantially regularly-spaced throughout a single rotation of the shaft. In a multi-cylinder internal combustion engine, for example, these torsional disturbances are a consequence of equally-spaced power pulses generated within the engine cylinders. For example, in an eight-cylinder engine, there are generated four equally-spaced power pulses, and thus four regularly-spaced disturbances for each revolution of the crankshaft. In a multi-blade grinding apparatus, e.g., a tree chopper, having shaft-driven blades which engage objects being ground at a predetermined number of equally-spaced intervals during a single revolution of the driving shaft, there are produced an equal number of regularly-spaced disturbances for each revolution of the shaft.

With regard to engine-driven shafts, it is known that the torsional vibrations induced in rotating shafts can be controlled, to a degree, with vibration absorber devices intended to oppose the forces which excite, and thus absorb, the vibrations. The operating principles of a vibration absorber are in contrast to those of a vibration damper which is intended to dissipate energy of the vibrations.

One vibration absorber is described in U.S. Pat. No. 2,346,972 as including a wheel, or auxiliary flywheel, which is attachable to the crankshaft of an engine and which is provided with a series of circular pockets that are regularly spaced about the center of the crankshaft. A cylindrical inertia member is positioned within each pocket so as to be free to move both radially and rotatively with respect to the wheel. During operation of the engine, the firing pulses of the engine rotate the wheel with the crankshaft and induce oscillatory movements in the inertia members which are intended to counteract the torsional crankshaft vibrations.

It is an object of the present invention to provide a new and improved system for absorbing torsional vibration and for reducing speed variations in a rotating shaft exposed to disturbances of the aforedescribed class.

Another object of the present invention is to provide such a system which absorbs torsional vibration and reduces speed variations in a rotating shaft at all shaft speeds.

Still another object of the present invention is to provide such a system whose design can be optimized without the need for time-consuming trial and error techniques.

Yet another object of the present invention is to provide such a system which is uncomplicated in construction and effective in operation.

SUMMARY OF THE INVENTION

This invention resides in a system for absorbing torsional vibration in a shaft which is drivingly rotated about an axis and wherein the shaft is exposed to torsional disturbances which tend to alternately increase and decrease the rotational speed of the shaft and wherein the disturbances are regularly spaced throughout each revolution of the shaft.

The system includes means defining at least one elongated cavity for rotating with a rotating shaft as the shaft rotates about its axis of rotation, and the elongated cavity is arranged in such a relation to the shaft so that the longitudinal axis of the cavity is substantially parallel to the axis of shaft rotation. The system also includes a rolling element positioned within the cavity so as to be free to roll forwardly and rearwardly with respect to the direction of rotation of the shaft along the interior wall of the cavity in a pendulum action in response to the torsional disturbances during shaft rotation. Each rolling element is related to the elongated cavity and to the torsional disturbances desired to be absorbed by the system in accordance with the equation:

$$N^2 = r_w^2 r_3 / [r_g^2 + r_w^2][r_1 - r_w]$$

wherein N is within about ±15% of the number of the torsional disturbances per revolution, $r_w$ is the radius of the rolling element, $r_g$ is the radius of gyration of the rolling element, $r_1$ is the radius of the cavity, and $r_3$ is the radial distance of the cavity from the axis of rotation of the shaft.

BRIEF DESCRIPTION OF THE DRAWINGS

FIG. 7 is a front elevational view of another embodiment of an absorber incorporating features of the present invention.

FIG. 8 is a front elevational view of still another embodiment of an absorber incorporating features of the present invention.

FIG. 9 is a fragmentary perspective view of a rotatable shaft and an absorber system utilized with the shaft.

DETAILED DESCRIPTION OF THE ILLUSTRATED EMBODIMENTS

Figure 1:
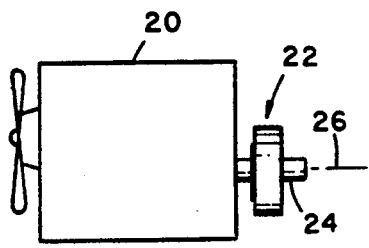
FIG. 1 is an elevational view illustrating schematically an internal combustion engine utilizing a torsional vibration absorber embodying features of the present invention.

Turning now to the drawings in greater detail, there is shown in FIG. 1 a system, generally indicated 22, for absorbing vibrations in a rotatable shaft 24 associated with an internal combustion engine 20. The shaft 24 is rotated about an axis of rotation 26 in response to the power pulses generated within the engine, and the torsional vibrations induced in the shaft 24 are effected by the torsional disturbances created by the alternating power and compression strokes within the engine cylinders. The rotatable shaft 24 may take the form of an engine crankshaft, a flywheel, a clutch, a torque converter, or some other part which is rotatably driven by the crankshaft. Furthermore, the system 22 may be incorporated within the shaft 24 or mounted upon the shaft 24 so as to be disposed, for example, on the front or the rear of the engine block. Moreover, the engine 20 with which the system 22 is used may be either a spark-ignited or a diesel-powered engine.

Although the depicted system 22 is described herein as being used in connection with a shaft 24 exposed to torsional disturbances induced by the alternating power and compression strokes within an engine 20, a system in accordance with the broader aspects of the invention can be used for absorbing torsional vibrations in other rotating shafts which are exposed to cyclic torsional disturbances during rotation. In the interests of the present invention, cyclic torsional disturbances are torsional disturbances which tend to alternately increase and decrease the rotational speed of the shaft and wherein the disturbances are substantially regularly spaced throughout each revolution of the shaft. Accordingly, the principles of the present invention can be variously applied.

As will be apparent herein, each system embodiment described hereinafter involves cavity-defining means associated with a rotatable shaft for rotation with the shaft as the shaft rotates about its axis of rotation. The cavity-defining means includes at least one elongated cavity which is spaced from the axis of shaft rotation and oriented so that the longitudinal axis of each cavity is substantially parallel to the axis of shaft rotation. Positioned within each cavity is a rolling element which, during rotation of the shaft, is permitted to freely roll along at least a section of the interior wall of the cavity in an oscillatory notion, i.e., in a pendulum action, as the rotatable shaft tends to vibrate (torsionally) in response to the torsional disturbances to which the shaft is exposed.

It is a feature of each system embodiment that each rolling element is related to its corresponding elongated cavity and to the torsional disturbances desired to be absorbed in accordance with the equation:

$$N^2 = r_w^2 r_3 / [r_g^2 + r_w^2][r_1 - r_w]$$

wherein N is within about ±15% of the number of the torsional disturbances per revolution, $r_w$ is the radius of the rolling element, $r_g$ is the radius of gyration of the rolling element, $r_1$ is the radius of the cavity, and $r_3$ is the radial distance of the cavity from the axis of rotation of the shaft.

With reference still to FIG. 1, the engine 20 has cylinders within which firing pulses are generated in a predetermined sequence. Moreover, for a substantially constant engine speed, the firing pulses in the engine 20 are substantially equally spaced throughout a single revolution of the shaft 24. The system 22 obtains its optimum vibration-absorbing performance while the firing pulses are substantially equally spaced as aforedescribed but absorbs an appreciable amount of torsional vibrations at all engine speeds. The depicted system 22 is affixed to the shaft 24 for rotation therewith and, for this purpose, the crankshaft 24 includes a keyway 28, as best shown in FIG. 2.

Figure 2:
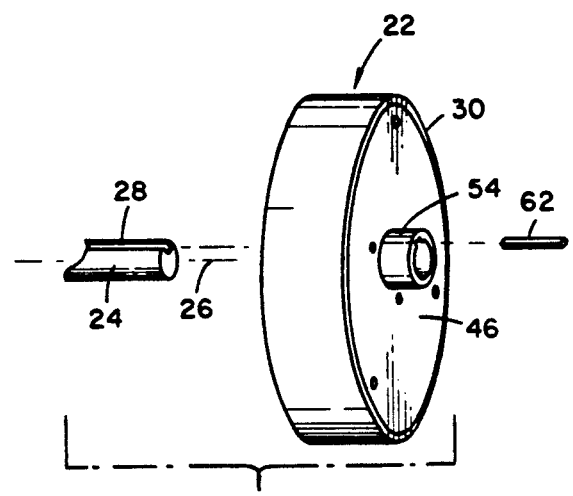
FIG. 2 is a perspective view of the vibration absorber depicted in FIG. 1.
Figure 3:
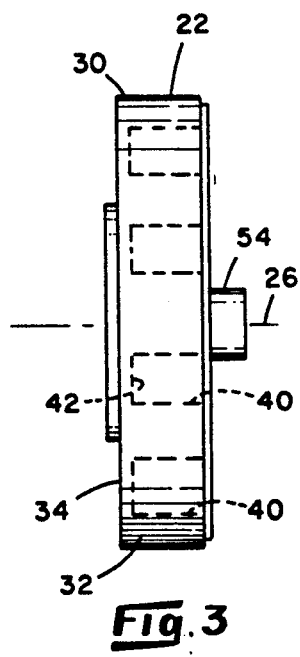
FIG. 3 is an side elevational view of the FIG. 2 absorber, as seen generally from the left in FIG. 2.
Figure 4:
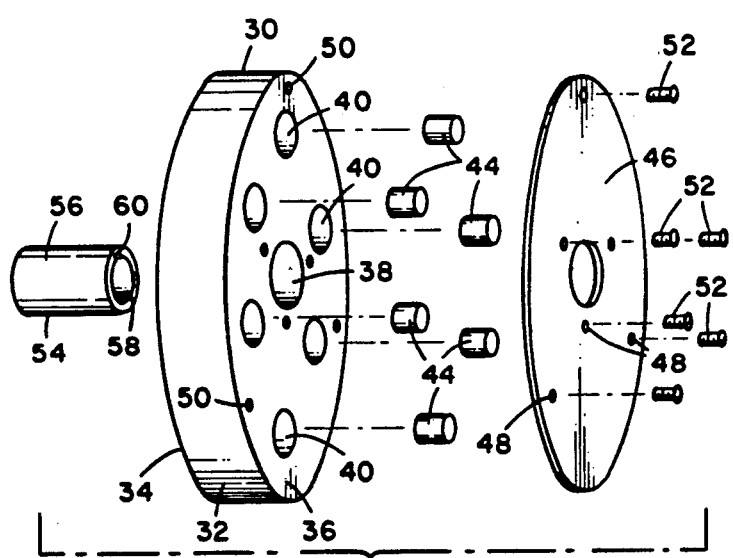
FIG. 4 is a perspective view of the FIG. 2 absorber, shown exploded.
Figure 5:
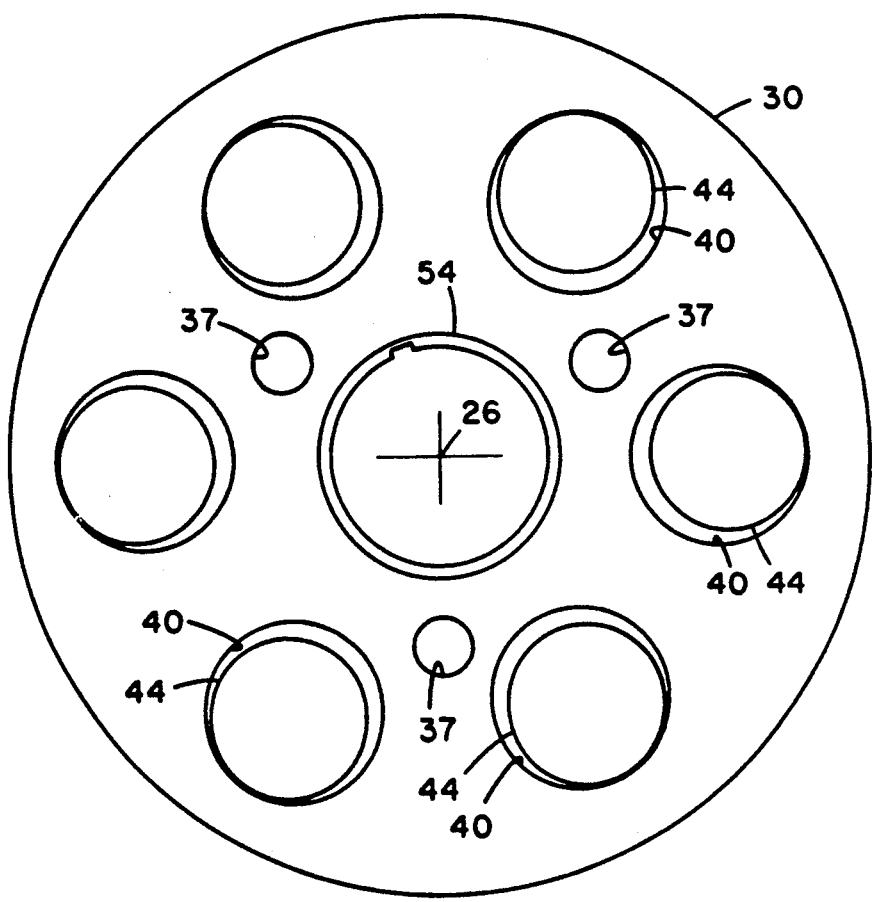
FIG. 5 is an elevational view of selected components of the FIG. 2 absorber, when assembled and as seen generally from the right in FIG. 4.

With reference to FIGS. 2–4, the system 22 includes cavity-defining means 25 including a substantially plate-like wheel body 30 having a cylindrical outer periphery 32, two opposite planar faces 34, 36 and a central opening 38. Six circular recesses, or cavities 40, are defined in the face 36 of the body 30 so as to be regularly spaced about and located at an equal distance from the central opening 38. Each circular cavity 40 has cylindrical interior walls and a longitudinal axis which is oriented substantially parallel to the axis of rotation of the body 30 (as the body 30 rotates with the crankshaft 24 about the axis 26). In addition, each cavity 40 has a radius which is equal to the radius of every other cavity in the body 30, and each cavity 40 has a planar bottom, or base 42, which is substantially parallel to the body face 36. If desired, the body 33 may be provided with internally-threaded apertures 37 (shown in FIG. 5) with which a secondary body, e.g., a flywheel or belt pulley, can be secured to the body 30 with bolts. In such an instance, the cavities 40 would be positioned about the center of the body 30 so as not to interfere with the apertures 37, and the number of cavities 40 provided in the body 30 is preferably equal to an integer multiple of the number of apertures 37.

The system 22 also includes six cylindrical rolling elements 44 positioned within the cavities 40 wherein each element 44 is positioned within a corresponding cavity 40. In the depicted system 22, the radii of the elements 44 are equal and the radius of each element 44 is slightly smaller than that of the cavity 40 within which the element 44 is positioned. As will be apparent herein, each element 44 is free to roll along the cylindrical sidewalls of its corresponding cavity 40 in a pendulum action during rotation of the wheel body 30 about the axis 26 and, in the depicted embodiment, has a length which is slightly shorter than the depth of its cavity 40.

For purposes of maintaining the elements 44 within the cavities 40, the system 22 includes a circular plate 46 releasably secured to the wheel body 30 adjacent the face 36. To this end, the plate 46 includes a series of apertures, or through-openings 48, extending between the opposite sides of the plate 46, and the wheel body 30 includes a series of internally-threaded apertures 50 disposed across the face 36 and which are aligned with the through-openings 48 of the plate 46. Headed screws 52 are inserted through the through-openings 48 and tightened within the apertures 50 to secure the plate 46 against the face 36 of the wheel body 30 and thereby maintain the elements 44 within the cavities 40. Because the plate 46 is releasably secured to the wheel body 30 with the screws 52, access can be had to the interiors of the cavities by removing the plate 46 from the wheel body 30.

For purposes of mounting the wheel body 30 about the crankshaft 24, the system 22 includes a collar 54 tightly positioned so as to be secured within the central opening 38 of the wheel body 30. As best shown in FIG. 4, the collar 54 includes an outer cylindrical perphery 56 sized to be received by the opening 38 in a press-fit relationship therewith and a hollow interior 58 sized to closely receive the crankshaft 24 when inserted thereupon. A groove 60 is provided along the length of the interior 58 and cooperates with the groove 28 of the crankshaft 24 to provide a keyway for accepting a key 62 (FIG. 2) inserted therein. When the wheel body 30 is positioned upon the crankshaft 24 and the key 62 is accepted by the provided keyway, the wheel body 30 is affixed to the crankshaft 24 so that as the crankshaft 24 is rotated in response to the firing pulses generated within the engine cylinders, the wheel body 30 is rotated as well.

Figure 6:
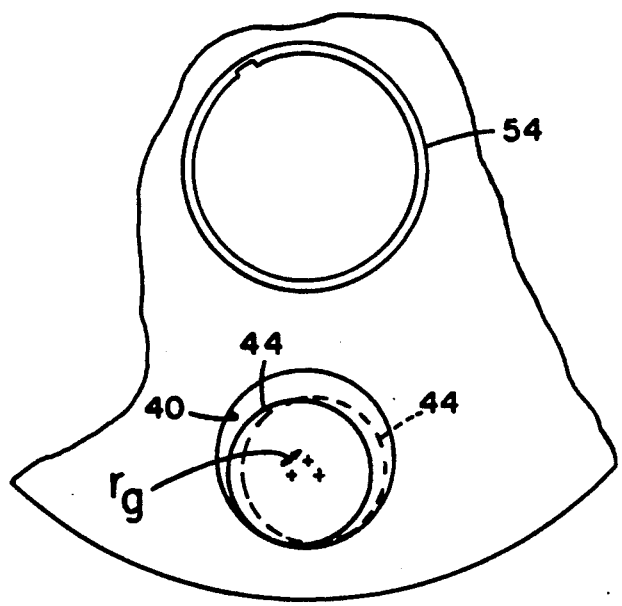
FIG. 6 is a view of a fragment of the components illustrated in FIG. 5.

As the crankshaft 24 is rotated in response to the firing pulses generated within the engine cylinders, each cylindrical element 44 oscillates within its corresponding cavity 40 as a centrifugal pendulum between, for example, the solid and phantom positions illustrated in FIG. 6. In this connection, each power pulse generated within the engine 20 effects a small increase in engine, i.e., crankshaft, speed which, in turn, shifts each cylindrical element 44 within its cavity 40 in the rotational direction opposite the rotational direction of the wheel body 30 about the rotation axis 26. This rearward shift of the element 44 tends to reduce, and thereby lessen the vibratory effects of, this small increase in engine speed. Conversely, the compression stroke of each engine cylinder effects a small decrease in engine, i.e., crankshaft, speed which, in turn, shifts each cylindrical element 44 within its cavity 40 in the rotational direction corresponding to the rotational direction of the wheel body 30 about the rotation axis 26. This forward shift of the element 44 tends to reduce, and thereby lessen the vibratory effects of, this small decrease in engine speed. Under some circumstances and by way of example, each element 44 may roll forwardly and rearwardly along the cavity walls through an arc of up to about 40° of movement during operation of the system 22.

As each cylindrical element 44 oscillates within its corresponding cavity, it moves in rolling engagement, without slip, along the interior wall of its cavity 40. Computer studies reveal that the minimum coefficient of friction required between the engaging surfaces of the element and the cavity walls in order to ensure that the element 44 rolls without slipping along the walls is relatively low. In practice, however, it is preferred that at least one of the surfaces of the element 44 or the cavity walls be appropriately coated, treated or machined to increase the surface-to-surface friction between these parts to reduce any likelihood of slip. Such surface-to-surface frictional characteristics may be obtained by providing each element 44 or the cavity walls with a textured surface. Lubrication between the engaging surfaces is neither desired nor necessary. To reduce friction and noise which may be created by contact between the ends of the elements 44 and the ends of the cavities 40, a low friction material, such as brass, Teflon or urethane may be placed over the ends of the elements 44 or inside the ends of the cavities 40.

In accordance with the equation provided above and in order for the system 22 to be as effective as possible, the ratio of the natural frequency of any element 44 in a cavity 40 to the engine speed should be equal to the number of torsional disturbances, i.e., disturbance cycles, per revolution of the shaft desired to be absorbed. With regard to the depicted system 22, the number of torsional disturbances corresponds to the number of firing pulses of the engine per revolution of the crankshaft 24. For example, for an eight cylinder, four cycle engine, there are four firing pulses per revolution. This means that the natural frequency of an element 44 within its cavity 40 for this example is equal to four times the rotational speed of the engine.

In practice, it may not be possible to design the components of the system so that the right side of the equation provided above equals the exact number of torsional disturbances per revolution of the shaft, but it is believed that acceptable performance of the system is achieved if the right side of the equation is within about ±15% of the number of torsional disturbances per revolution of the shaft. Hence, the term N on the left side of the equation includes a permissible range of values above and below the exact number of the torsional disturbances per revolution of the shaft being addressed by the system design. For improved absorption of the torsional vibrations, the right side of the equation is within about ±5% of the number of torsional disturbances per revolution of the shaft.

Computer studies have confirmed that because of nonlinearities and other effects, better performance is achieved when the right side of the above-provided equation is slightly greater than the ideal value, i.e., the number of torsional disturbances per revolution being addressed, than when the right side of the equation is slightly less than the ideal value. Thus, if in practice, the system components cannot be designed so that the right side of the equation is exactly equal to the number of torsional disturbances per revolution of the shaft being addressed, it is preferable that the system components be designed so that the right side of the equation be slightly greater than (as opposed to less than) the number of torsional vibrations per revolution of the shaft.

To increase the effectiveness of the absorber system 22 for controlling and reducing torsional vibrations, the outer diameter and the thickness of the wheel body 30 should be as large as possible, or as large as is practical, for a given application. The cylindrical elements 40 should preferably be constructed of a relatively dense material, such as steel. The effectiveness of the absorber system 22 can be a strong function of the outer diameter of the wheel body. For each particular outer diameter of the body, there is an optimum number of cavities, cavity radius ($r_1$), and the radius location of the cavity ($r_1$). In addition, it is also preferable to locate the cavities as close together as is consistent with the strength capability of the wheel body.

For illustrative purposes, exemplary dimensions of the system 22 wherein N=4 and in accordance with the aforementioned equation are provided here as follows. The outer diameter of the wheel body 30 is about 6.125 inches, the diameter of each element 44 is about 1.210 inches, the diameter of each cavity 40 is about 1.375 inches, and the radial distance ($r_3$) of each cavity 40 from the rotation axis 26 is about 1.980 inches.

The system 22 is advantageous in several respects. In the first instance, the system 22 has the potential for absorbing much more torsional vibration and reducing speed variation in the crankshaft 24 than could be had with vibration absorbers of the prior art. Of course, by better controlling torsional vibration, the likelihood of a crankshaft failure is reduced. Secondly, the system 22 provides vibration absorption over the entire speed range of the engine. More specifically, the system 22 is tuned, or designed, to absorb torsional vibrations for a predetermined number of power pulses per revolution, and its design is not a function of engine speed. Thus, the system 22 is effective at all engine speeds. Thirdly and in contrast to vibration dampers which control damping by energy dissipation, the vibration absorbing system 22 does not operate by dissipating energy.

In addition, the useful life of the system 22 is believed to be very long. With no sliding contact between the cylindrical elements and the cavity walls, little wear of the system components is expected. Furthermore and in contrast to some vibration absorbers and dampers of the prior art, there is no fluid to leak or elastomer to fail.

Still further, the uncomplicated design of the system 22 enables it to be constructed with relatively small cost, which cost is believed to be cleary less than that of some classes of dampers constructed for damping torsional vibrations.

It will be understood that numerous modifications and substitutions can be had to the system embodiment 22 without departing from the spirit of the invention. For example, although the system 22 has been shown and described as including six cavities 40 within which cylindrical elements 44 are positioned, a system in accordance with the broader aspects of the present invention may possess an alternative number of cavities. For example, there is shown in FIG. 7 an alternative system 64 having a wheel body 66 within which eight cavities 68 ore defined.

Furthermore, there is shown in FIG. 8 another alternative system 70 having a wheel body 72 within which four cavities 74 are defined. Experimental test results performed with the system 70 (1) with and (2) without its elements 76 positioned therein showed that for an average rotational speed of the body 72 of about 800 to 810 rpm, the amplitude of fluctuations in the rotational speed of the body 72 with its elements 76 in place is less than about one-half of that of the body 72 without its elements in place.

Still further, although the aforedescribed system embodiments have been shown and described as including wheel bodies of cylindrical configuration, the system cavity-defining body may take an alternative form. For example, there is shown in FIG. 9 a system embodiment 80 which has been integrated within the body of an engine crankshaft 82. In the system 80, the cavity-defining means is provided by a radial section, indicated 84, of the crankshaft 82, and the radial section 84 defines a recess 86 which opens out of one side of the section 84. A cylindrical element 88 is captured between the bottom of the recess 86 and a plate 90 affixed to the one side of the section 84 so as to cover the opening of the recess 86.

Figure 10:
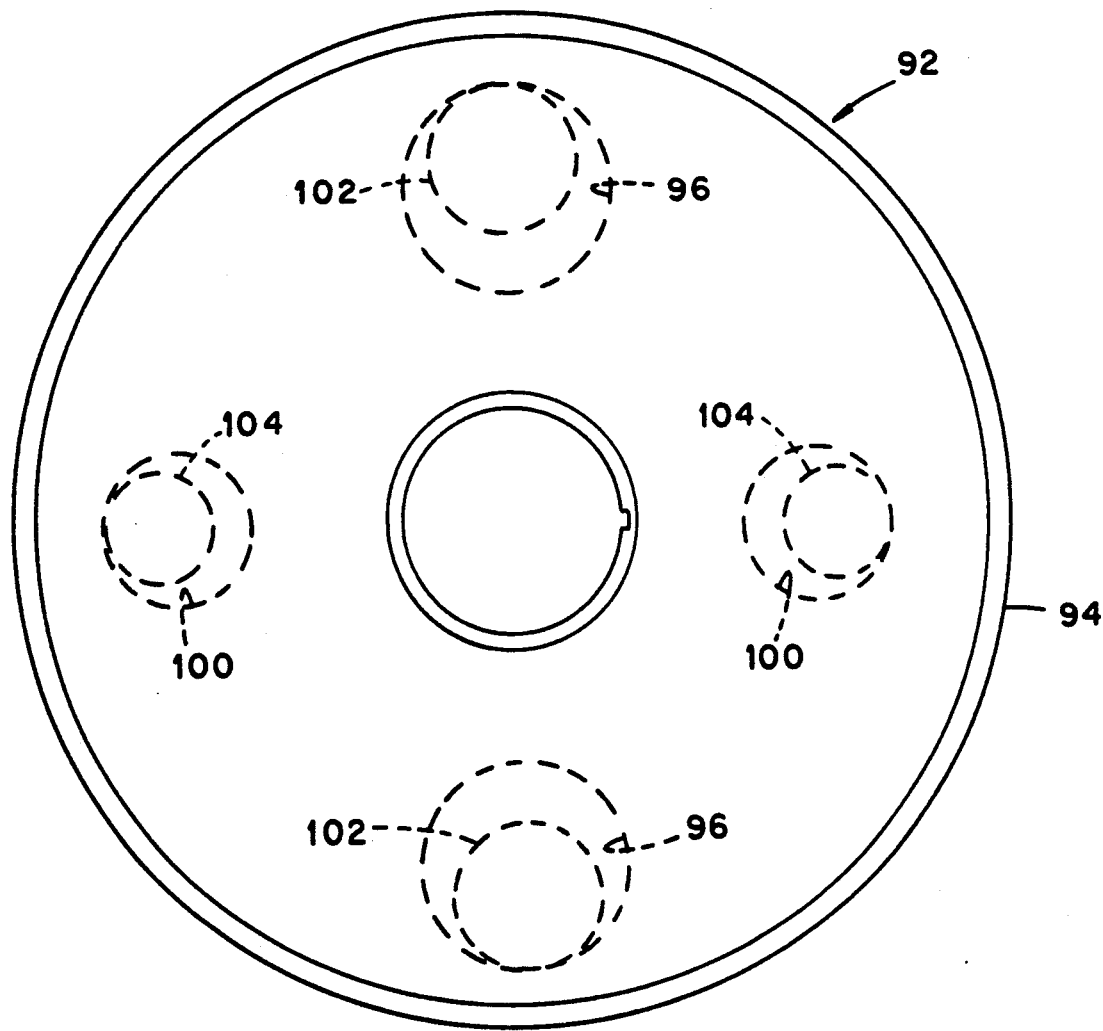
FIG. 10 is a front elevational view of yet still another embodiment of an absorber incorporating features of the present invention.

Yet still further, although the aforedescribed system embodiments have been shown and described as including cylindrical cavities of equal size and including cylindrical elements of equal size, a system in accordance with the broader aspects of the invention may include differently-sized cavities and differently-sized elements. For example, there is shown in FIG. 10 a system 92 which has been designed to absorb torsional vibration in a shaft which is exposed to cyclic torsional disturbances of one frequency, e.g., four disturbances per revolution of a shaft, and other cyclic torsional disturbances of another frequency, e.g. five disturbances per revolution of the shaft. To this end, the system 92 includes a cavity-defining body 94 within which is defined two cavities 96, 96 of one diameter and one radial distance from the shaft axis 98 and two additional cavities 100, 100 of another diameter and another radial distance from the shaft axis 98. Elements 102, 102 are positioned within the cavities 96, 96 and are related to the cavities 96, 96 in accordance with the equation provided above so that the right side of the equation is about equal to the number of torsional disturbances of one frequency, e.g., four, and elements 104, 104 are positioned within the cavities 100, 100 and are related thereto in accordance with the equation so that the right side of the equation is about equal to the number of torsional disturbances of the other frequency, e.g., five.

It follows from the foregoing description of system 92 that the number of torsional disturbances addressed by each element 102 and its cavity is a predetermined number, e.g., four or five, of disturbances per revolution of a shaft, rather than the cumulative total number, e.g., nine, of disturbances per revolution of the shaft.

Further still, the arrangement, number, and size of the system cavities do not have to be symmetrical about the rotation axis of the system body. Moreover, the location of the cavities do not need to be totally symmetrical nor do all the holes have to be located at the same radial distance from the center of rotation. Each cavity and corresponding cylindrical element merely needs to satisfy the equation provided above as the cavity and element address a predetermined number of torsional disturbances through a single revolution of a shaft.

Accordingly, the aforedescribed embodiments are intended for the purpose of illustration and not as limitation.

I claim:

1. A system for absorbing torsional vibration in a shaft which is drivingly rotated about an axis and wherein the shaft is exposed to torsional disturbances which tend to cyclically increase and decrease the rotational speed of the shaft, the system comprising:

means defining at least one elongated cavity for rotating with a rotating shaft as the shaft rotates about its axis of shaft rotation, the elongated cavity arranged in such a relation to the shaft so that the longitudinal axis of the cavity is substantially parallel with the axis of shaft rotation;

a rolling element positioned within the one elongated cavity so as to be free to roll forwardly and rearwardly with respect to the direction of rotation of the shaft along the interior wall of the one cavity in a pendulum action upon exposure of the shaft to torsional disturbances during rotation; and wherein the rolling element is related to the one elongated cavity and to the torsional disturbances desired to be absorbed by the system in accordance with the equation:

$$N^2 = r_w^2 r_3 / [r_g^2 + r_w^2][r_1 - r_w]$$

wherein N is within about ±15% of the number of torsional disturbances per revolution of the shaft, $r_w$ is the radius of the rolling element, $r_g$ is the radius of gyration of the rolling element, $r_1$ is the radius of the one cavity, and $r_3$ is the radial distance of the one cavity from the axis of rotation of the shaft.

2. The system as defined in claim 1 wherein N is within at least about ±5% of the number of torsional disturbances per revolution of the shaft desired to be absorbed.

3. The system as defined in claim 1 wherein N is at least as great as the number of torsional disturbances per revolution of the shaft desired to be absorbed.

4. The system as defined in claim 1 wherein there are at least two elongated cavities defined by the cavity-defining means, a rolling element is positioned within each cavity as aforesaid, and each rolling element is related to its corresponding cavity and to the torsional disturbances desired to be absorbed by the system in accordance with the aforesaid equation.

5. The system as defined in claim 4 wherein the cavities are regularly spaced about the axis of shaft rotation.

6. The system as defined in claim 1 wherein the cavity-defining means is provided by a body which is securable to the shaft with which the system is utilized.

7. The system as defined in claim 6 wherein the body is a first body and includes a plurality of apertures with which a second body is securable to the first body.

8. The system as defined in claim 7 wherein the number of cavities is an integer multiple of the number of apertures.

9. The system as defined in claim 1 wherein the surface-to-surface contact between the periphery of each rolling element and the walls of its corresponding cavity is relatively high to reduce any likelihood of slip therebetween as the element rolls along the cavity walls during operation of the system.

10. The system as defined in claim 1 wherein the shaft is driven about its axis in response to power pulses generated within the cylinders of an internal combustion engine and wherein the number of torsional disturbances desired to be absorbed corresponds with the number of power pulses per revolution of the engine.

11. A system for absorbing torsional vibration in a shaft which is drivingly rotated about an axis and wherein the shaft is exposed to torsional disturbances during rotation and wherein the disturbances are substantially regularly spaced throughout each revolution of the shaft, the system comprising:

means defining at least one cavity of circular cross section for rotating with a rotating shaft as the shaft rotates about its axis of shaft rotation, the cavity being arranged in such a relation to the shaft so that its circular cross section is substantially normal to the axis of shaft rotation;

a cylindrical rolling element positioned within each cavity so as to be free to roll along the walls of its corresponding cavity in a pendulum action in response to the torsional disturbances to which the shaft is exposed; and wherein the cylindrical rolling element is related to its corresponding cavity and to the torsional disturbances desired to be absorbed by the system in accordance with the equation:

$$N^2 = r_w^2 r_3 / [r_g^2 + r_w^2][r_1 - r_w]$$

wherein N is within about ±15% of the number of torsional disturbances per revolution of the shaft, $r_w$ is the radius of the rolling element, $r_g$ is the radius of gyration of the rolling element, $r_1$ is the radius of the cavity, and $r_3$ is the radial distance of the cavity from the axis of rotation of the shaft.

12. A system for absorbing torsional vibration in an internal combustion engine having multiple cylinders and a shaft which rotates about an axis in response to power pulses generated within the engine cylinders and wherein the power pulses create torsional disturbances in the shaft which are substantially regularly spaced throughout each revolution of the shaft, the system comprising:

means associated with the rotating shaft of the engine for defining an elongated cavity which rotates with the shaft about the axis of shaft rotation, the cavity being arranged in such a relation to the shaft that the longitudinal axis of the cavity is substantially parallel with the axis of shaft rotation;

a rolling element positioned within the elongated cavity so as to be free to roll forwardly and rearwardly with respect to the direction of rotation of the shaft along the interior wall of the cavity in a pendulum action in response to the torsional disturbances created in the shaft during the rotation thereof; and wherein each rolling element is related to its corresponding cylindrical cavity and to the engine with which the system is used in accordance with the equation:

$$N^2 = r_w^2 r_3 / [r_g^2 + r_w^2][r_1 - r_w]$$

wherein N is within about ±15% of the number of power pulses per revolution of the engine shaft, $r_w$ is the radius of each rolling element, $r_g$ is the radius of gyration of the element, $r_1$ is the radius of the cavity, and $r_3$ is the radial distance of the cavity from the axis of rotation of the shaft.

13. The system as defined in claim 12 wherein N is within at least about ±5% of the number of power pulses per revolution of the shaft.

14. The system as defined in claim 12 wherein N is at least as great as the number of torsional disturbances per revolution of the shaft.

15. The system as defined in claim 12 wherein the cavity-defining means defines at least two elongated cavities arranged about the shaft as aforesaid, a rolling element is positioned within each cavity so as to be free to roll along the wall of its corresponding cavity as aforesaid, and each rolling element is related to its corresponding cavity and to the torsional disturbances desired to be absorbed by the system in accordance with the aforesaid equation.

16. The system as defined in claim 15 wherein the cavities, are regularly spaced about the axis of shaft rotation.

17. The system as defined in claim 12 wherein the cavity-defining means is provided by a body which is securable to the shaft with which the system is utilized.

18. The system as defined in claim 17 wherein the body is a first body and includes a plurality of apertures with which a second body is securable to the first body.

19. The system as defined in claim 18 wherein the number of cavities is a integer multiple of the number of apertures.

20. The system as defined in claim 12 wherein the surface-to-surface contact between the periphery of the rolling element and the walls of the cavity is relatively high to reduce any likelihood of slip therebetween as the element rolls along the cavity walls during operation of the system.

* * * * *